United States Patent
Demonsant et al.

(10) Patent No.: US 11,663,350 B2
(45) Date of Patent: May 30, 2023

(54) ENHANCED MECHANISMS FOR INFORMATION EXCHANGE IN AN ENTERPRISE ENVIRONMENT

(71) Applicant: Planisware SAS, Chatillon (FR)

(72) Inventors: Pierre Demonsant, Paris (FR); Fabrice Ollivier, Paris (FR); Thibault Roche, Paris (FR)

(73) Assignee: PLANISWARE SAS, Châtillon (FR)

( * ) Notice: Subject to any disclaimer, the term of this patent is extended or adjusted under 35 U.S.C. 154(b) by 0 days.

(21) Appl. No.: 16/414,730

(22) Filed: May 16, 2019

(65) Prior Publication Data

US 2019/0356499 A1    Nov. 21, 2019

Related U.S. Application Data

(60) Provisional application No. 62/672,536, filed on May 16, 2018.

(51) Int. Cl.
| | |
|---|---|
| *G06F 21/62* | (2013.01) |
| *H04L 12/18* | (2006.01) |
| *H04L 67/00* | (2022.01) |
| *H04L 9/40* | (2022.01) |
| *H04L 67/131* | (2022.01) |

(52) U.S. Cl.
CPC ...... *G06F 21/6218* (2013.01); *H04L 12/1822* (2013.01); *H04L 63/08* (2013.01); *H04L 63/102* (2013.01); *H04L 67/131* (2022.05); *H04L 67/34* (2013.01)

(58) Field of Classification Search
CPC .... G06F 16/176; G06F 21/62; G06F 21/6218; G06F 21/6245; G06F 21/6272; G06F 3/1454; G06Q 10/103; G16H 10/00; G16H 10/60; G16H 80/00; H04L 67/02; H04L 67/10; H04L 67/38;
(Continued)

(56) References Cited

U.S. PATENT DOCUMENTS

| | | | |
|---|---|---|---|
| 10,165,022 B1 * | 12/2018 | Hubbard | ............... H04L 63/102 |
| 2003/0097410 A1 * | 5/2003 | Atkins | .................... H04L 67/10 709/206 |

(Continued)

OTHER PUBLICATIONS

Banerji, Preeta, et al. "Deploying an Enterprise-Ready Content Sync-and-Share Solution." (2013). (Year: 2013).*

(Continued)

*Primary Examiner* — Atta Khan
*Assistant Examiner* — William C McBeth
(74) *Attorney, Agent, or Firm* — Kwan & Olynick LLP

(57) ABSTRACT

Systems and methods for the exchange of information between an enterprise client and a partner within an enterprise environment are provided. In this exchange of information, the client selects, via a user interface, a subset of client data, as well as one or more screen sets, to share with a partner. Once the partner has accepted, the system then sends an account creation request or account login request to the partner. Once the partner is authenticated in the system with an account, the system creates an information exchange session for the partner, and provides, on a display of the partner's device, a user interface that shows the subset of the client data and the screen sets. Access to the rest of the customer's enterprise environment is restricted.

20 Claims, 12 Drawing Sheets

(58) Field of Classification Search
CPC ....... H04L 63/08; H04L 63/083; H04L 63/10; H04L 63/101; H04L 63/102
See application file for complete search history.

(56) References Cited

U.S. PATENT DOCUMENTS

| | | | | |
|---|---|---|---|---|
| 2006/0031779 | A1* | 2/2006 | Theurer | G06F 3/1454 715/781 |
| 2006/0235716 | A1* | 10/2006 | Mahesh | G06Q 10/103 709/204 |
| 2010/0070842 | A1* | 3/2010 | Aymeloglu | G06F 3/0484 715/207 |
| 2010/0262925 | A1* | 10/2010 | Liu | G06Q 10/10 715/759 |
| 2012/0011451 | A1* | 1/2012 | Bansal | H04N 7/15 715/753 |
| 2012/0036452 | A1* | 2/2012 | Coleman | G06F 3/1462 715/751 |
| 2013/0007895 | A1* | 1/2013 | Brolley | G06F 21/62 726/28 |
| 2013/0036370 | A1* | 2/2013 | Ananthakrishnan | G06F 21/6245 715/753 |
| 2013/0097687 | A1* | 4/2013 | Storm | G06F 16/176 726/9 |
| 2013/0141471 | A1* | 6/2013 | Batson | G06F 3/1454 345/690 |
| 2013/0318589 | A1* | 11/2013 | Ford | H04L 65/403 726/7 |
| 2013/0318593 | A1* | 11/2013 | Smith | H04L 63/08 709/225 |
| 2014/0215356 | A1* | 7/2014 | Brander | G06F 21/6245 715/753 |
| 2015/0032686 | A1* | 1/2015 | Kuchoor | G06F 3/1454 707/608 |
| 2015/0373081 | A1* | 12/2015 | Laga | H04L 67/02 709/203 |
| 2016/0065672 | A1* | 3/2016 | Savage | H04L 67/1095 709/219 |
| 2016/0147952 | A1* | 5/2016 | Garcia | G16H 10/60 705/3 |
| 2017/0024100 | A1* | 1/2017 | Pieper | H04L 67/10 |
| 2017/0041296 | A1* | 2/2017 | Ford | H04L 63/083 |
| 2017/0200021 | A1* | 7/2017 | Patel | G06F 21/6245 |
| 2017/0249394 | A1* | 8/2017 | Loeb | H04L 67/02 |
| 2018/0053012 | A1* | 2/2018 | Myers | G16H 10/60 |
| 2018/0121667 | A1* | 5/2018 | Karpel | G06F 21/6227 |
| 2018/0218120 | A1* | 8/2018 | Canzoneri | G06F 21/6245 |
| 2018/0336373 | A1* | 11/2018 | Deenadayal | G06F 3/1454 |
| 2019/0020715 | A1* | 1/2019 | Haviv | H04L 67/1095 |
| 2019/0163927 | A1* | 5/2019 | Koch | G06F 21/6245 |
| 2019/0196774 | A1* | 6/2019 | Sarfi | G06F 3/1454 |
| 2020/0026485 | A1* | 1/2020 | Deenadayal | G06F 21/10 |

OTHER PUBLICATIONS

Chen, W. J., et al. "IBM Enterprise Content Management and Box. IBM International Technical Support Organization." (2016). (Year: 2016).*

Wise, Catherine, et al. "Cloud docs: secure scalable document sharing on public clouds." 2015 IEEE 8th International Conference on Cloud Computing. IEEE, 2015. pp. 1-2, 10, 16-18, 119 (Year: 2015).*

Mao, L. (n.d.), "Information Resources Management Framework for Virtual Enterprise," [online] Available at: https://arxiv.org/pdf/1512.02726 [Accessed Feb. 8, 2020], 6 pages.

Bailey-Woods, L., Hall, T.M., Halpert, A.M., Rhia, Ma, C., Kotyk, S., Neal, S. and Rhit (2012), "Ensuring Data Integrity In Health Information Exchange," [online] Available at: http://library.ahima.org/PdfView?oid=105612, 12 pages.

* cited by examiner

ENHANCED MECHANISMS FOR INFORMATION EXCHANGE IN AN ENTERPRISE ENVIRONMENT

CROSS-REFERENCE TO RELATED APPLICATIONS

This application claims the benefit of U.S. Provisional Application No. 62/672,536, entitled "ENHANCED MECHANISMS FOR INFORMATION EXCHANGE IN AN ENTERPRISE ENVIRONMENT," filed on May 16, 2018, which is incorporated by reference herein in its entirety for all purposes

TECHNICAL FIELD

The present disclosure relates to enterprise environments, and specifically to exchanging information in an enterprise environment.

DESCRIPTION OF RELATED ART

Enterprise environments are increasingly becoming essential for businesses, developers, enterprise vendors, sales teams, and more. These environments provide a set of tools for enterprise teams to collaborate with others internally within the enterprise, and some also provide solutions for collaborating externally with customers, vendors, and others. A common use of enterprise environments is for project management, wherein the environment may include such features as tracking and modification of project development milestones, collaborative tools for document creation, time sheet reporting and tracking, task scheduling, and more. Many of these project management tools incorporate software as a service (or "SaaS") technologies, which provide "on-demand" delivery of solutions in a cloud-based fashion, allowing for project management and customer environments accessible via browsers, as well as remote, convenient accessibility of project information and data wherever it is stored.

Some project management systems are moving from single-user/single-project management systems to complex, distributed, multi-functional systems that incorporate multidimensional data, and no longer cover project planning alone. Such systems are notably working towards solving challenges around teams being increasingly geographically dispersed, leading to time zone, communication, collaboration, and organizational boundaries. The need for such enterprise collaborative environments is great.

In current project management systems and enterprise collaborative environments, information exchange typically has some limitations. For example, an enterprise client may wish to share some information with subcontractors, but in many cases the only solution available is to give their subcontractors access to their own information system or client environment. Often, the subcontractors will have to go through the information system's security rules and authentication procedures, and in some cases deadlines are imminent and the client doesn't have time to provision access for the subcontractors before the end of the contract. Further, there is often no way to share data within the information system without providing access to the internet system of information of the customer, and potentially sharing much more information than intended with the subcontractor.

Consequently, it is desirable in an enterprise environment or project management system to provide enhanced mechanisms for information exchange between a client (such as an enterprise environment customer) and a partner (such as a subcontractor of the enterprise environment customer) that overcome some of the drawbacks of conventional systems.

Overview

Systems, methods, and devices provided herein provide for with the exchange of information between an enterprise client and a partner of that client within an enterprise environment. In this exchange of information, the enterprise system receives information from the client that the client wishes to exchange with the partner. The enterprise system sends this information from the client to the partner, in the form of a client request to exchange information. This request includes a subset of the client data in the enterprise environment, as well as one or more screen sets, both of which are selected by the client in a user interface. The system receives a notification that the partner has responded to the client request with an acceptance, and then sends an account creation request or account login request to the partner, depending on whether the partner has an account that is determined to be already present in the system. Once the partner is authenticated in the system with an account, the system creates an information exchange session for the partner, and provides, on a display of the partner's device, a user interface that shows the subset of the client data and the screen sets. Access to the rest of the customer's enterprise environment is restricted. In this process, the partner doesn't need to access the information system of the client, and the client doesn't need to ask for permission, access provided to the partner, or any other burdensome steps. The client shares only aspects of the client's information that it selects and approves within the enterprise environment.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
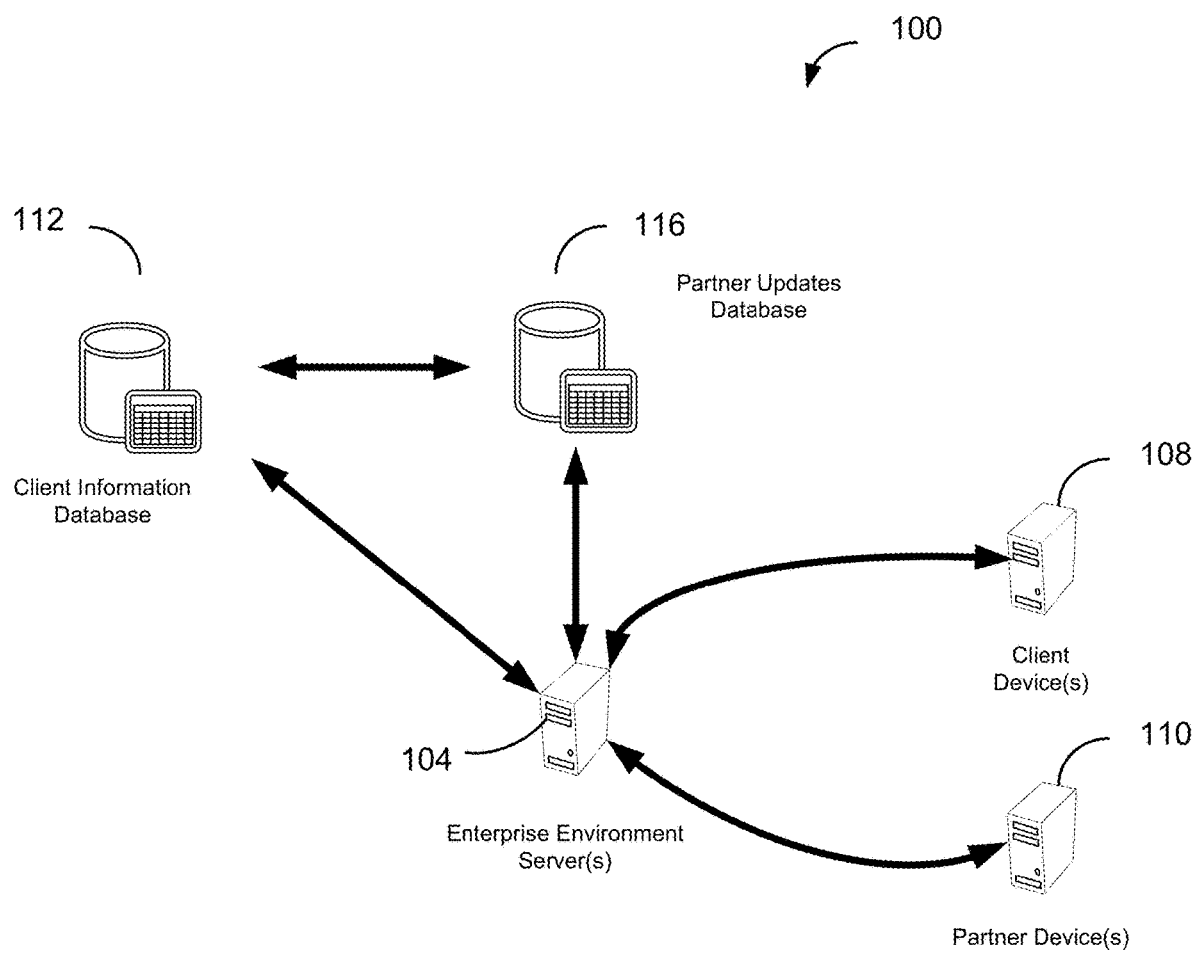
FIG. 1 shows a system diagram of an example of a system 100 for exchanging information within an enterprise environment, in accordance with some implementations.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of project management software, including exchange and sharing of project data, tasks or activities, project scheduling, developmental milestones, project planning documents, billing reports, and more. However, it should be noted that the techniques of the present invention apply to a wide variety of different enterprise environments, collaborative environments, data structures, and different types of data. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various organizations and enterprises rely on enterprise collaborative tools to manage, edit, update, and collaborate on projects, tasks, and activities. The systems, methods, and devices provided herein are concerned with the exchange of information between an enterprise client and a partner of that client within an enterprise environment. In this exchange of information, the enterprise system receives information from the client that the client wishes to exchange with the partner, such as project data, project milestones and deadlines, a roadmap of features, or any other information the enterprise client wishes to share. The partner will be the only entity other than the client with access to this information and data. In some embodiments, the enterprise system sends this information from the client to the partner, in the form of a client request to exchange information. This request includes a subset of the client data in the enterprise environment, as well as one or more screen sets, both of which are selected by the client in a user interface. The system receives a notification that the partner has responded to the client request with an acceptance, and then sends an account creation request or account login request to the partner, depending on whether the partner has an account that is determined to be already present in the system. Once the partner is authenticated in the system with an account, the system creates an information exchange session for the partner, and provides, on a display of the partner's device, a user interface that shows the subset of the client data and the screen sets. Access to the rest of the customer's enterprise environment is restricted. In some embodiments, the client data and screen sets that the client wishes to share are pushed and pulled from the cloud by the client, on the client side, without opening up access to the client's data by any entities within the enterprise environment.

In some embodiments, one or more pieces of client data are editable by the partner via the user interface. In some embodiments, the system receives a partner update from the partner device associated with the partner, consisting of one or more proposed edits to the shared pieces of client data. The system sends the partner update to the client, and then receives a validation of at least a portion of the partner update from the client. The system then incorporates the validation of the portion or all of the partner update into the pieces of client data.

FIG. 1 shows a system diagram of an example of a system 100 for exchanging information within an enterprise environment, in accordance with some implementations. System 100 includes a variety of different hardware and/or software components which are in communication with each other. In the non-limiting example of FIG. 1, system 100 includes at least one enterprise environment server 104, at least one client device 108, at least one partner device 110, client information database 112, and at least one partner updates database 116.

The enterprise environment server 104 may communicate with other components of system 100. This communication may be facilitated through a combination of networks and interfaces. Enterprise environment server 104 may handle and process data requests and data transfers from the client device 108 and the partner device 110. Likewise, enterprise environment server 104 may return a response to client device 108 after a data request has been processed. For example, enterprise environment server 104 may retrieve data from one or more databases, such as the client information database 112 or the partner updates database 116. It may combine some or all of the data from different databases, and send the processed data to one or more client devices or partner devices.

A client device 108 and partner device 110 may be computing devices capable of communicating via one or more data networks with a server. Examples of client device 108 and partner device 110 include a desktop computer or portable electronic device such as a smartphone, a tablet, a laptop, a wearable device, an optical head-mounted display (OHMD) device, a smart watch, etc. Client device 108 and partner device 110 include at least one browser in which applications may be deployed.

Client information database 112 can be a database implemented in a relational or non-relational database management system. In some embodiments, this database can include the contents of one or more client-related databases within the enterprise environment. Examples of data that can be stored within the client information database 112 in various embodiments are client information, partner information, project information, activity information, task information, billing report information, project roadmap information, and so on.

Partner updates database 116 can be a database implemented in a relational or non-relational database management system. In some embodiments, this database can include edits, modifications, and/or tracked changes information related to one or more documents that a client has shared with a partner in an editable fashion.

Figure 2:
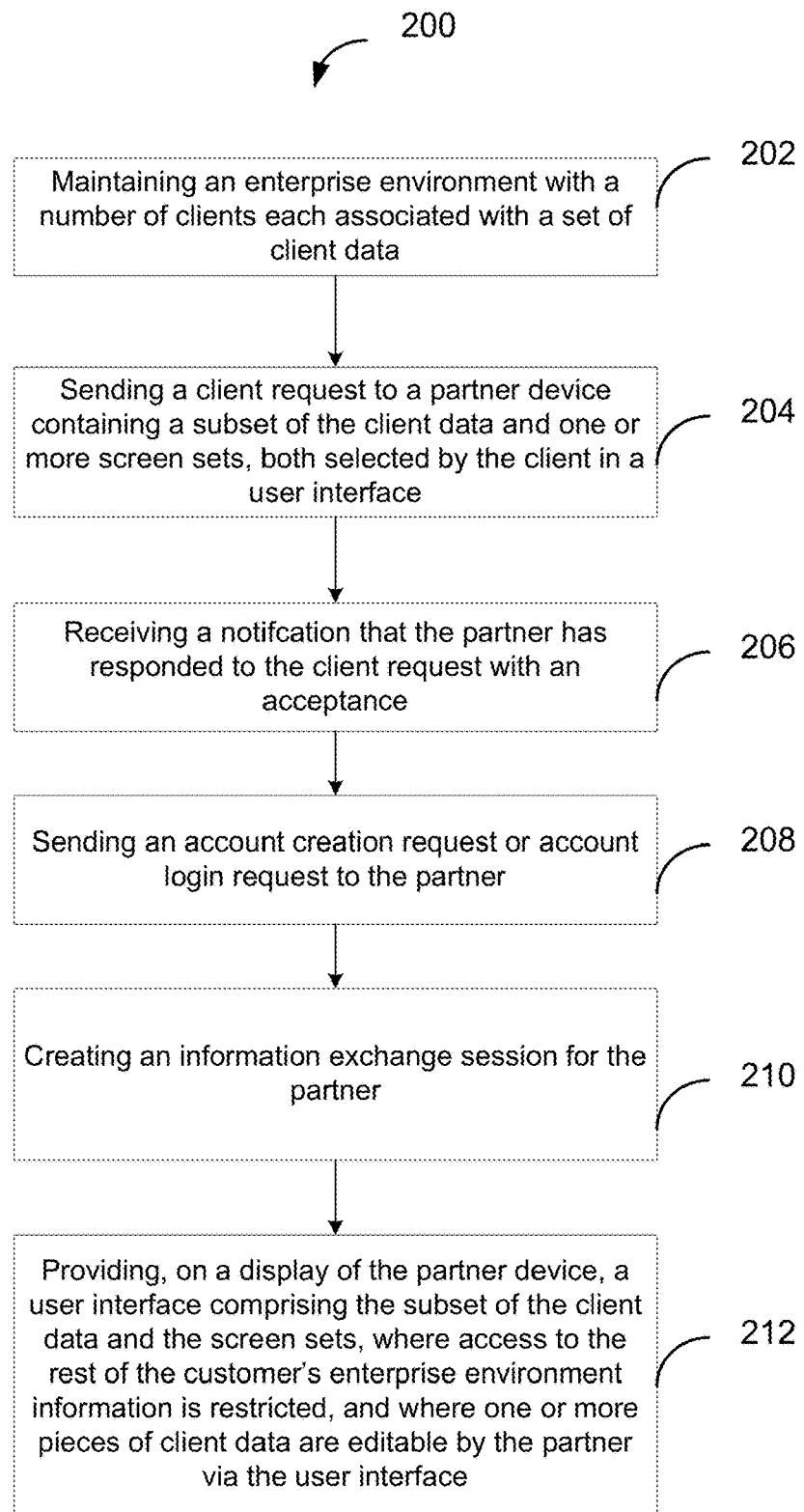
FIG. 2 illustrates one example 200 of a flow process diagram for exchanging information in an enterprise environment.

FIG. 2 illustrates one example 200 of a flow process diagram for exchanging information in an enterprise environment. In particular example embodiments, project data associated with the enterprise client in the enterprise environment is selected for sharing with a partner of the client, such as a subcontractor. As discussed above, various components of system 100 may be configured to implement the information exchange.

At block 202, the system maintains an enterprise environment with a number of clients. Each of the clients is associated with a set of client data. In some embodiments, the enterprise environment is a networked user interface for various enterprises, businesses, individuals, and entities, hereinafter referred to as "clients" or "enterprise clients", to capture, track, share, collaborate on, and modify their information. In some embodiments, the enterprise environment takes the form of a project management environment. In some embodiments, the enterprise environment hosts a number of files, accounts, clients, and/or databases via an arrangement of cloud-based servers, hosting, and deployment. In some environments, the enterprise environment has some combination of cloud-based servers, a client application running on the client device 108, a partner application, client application, or subset and/or restricted version of the client application running on the partner device 110, an enterprise host application running on one or more entities maintaining the enterprise environment, or a similar configuration.

At block 204, the system sends a client request to a partner device. In some embodiments, the client request contains a subset of the client data. For example, if a client has multiple projects in the enterprise environment, the client request may include just the product roadmap for one project. In some embodiments, the client request additionally contains one or more screen sets. In some embodiments, screen sets are screens within the client's user interface for the enterprise environment, which the client wants to share with the partner in the client request. In some embodiments, the screen sets mirror at least a portion of one or more user interface screens within the enterprise network that are associated with the client. In some embodiments, the contents of the client request (such as a subset of the client data, or one or more screen sets) are selected by the client in a user interface. In some embodiments, the client can have granular control over precisely which data is sent in the client request, including, for example, project, activity, and task metadata, portions of screens, screens with elements redacted or blurred, and more. In some embodiments, the system sends the client request by notifying the partner device. In some embodiments, this notification takes the form of an e-mail. In some embodiments, this email is automatically generated by the system. In some embodiments, the notification can be a social media message, text alert, or other form of notification automatically generated by the system.

At block 206, the system receives a notification that the partner has responded to the client request with an acceptance. In some embodiments, the acceptance takes the form of a reply to the email or text message, a click on a link, interaction with a button or other user interface element, or similar form of interaction signaling an acceptance of the client request.

At block 208, the system sends an account creation request or account login request to the partner. In some embodiments, if the system determines that an account already exists for the partner based on the existing information for the partner within the system, such as an email address, then the system presents a login screen to the partner. Upon filling in the login screen and attempting to sign in, the system performs authentication and security measures associated with login and identity processes. If no known account is found within the system, then in some embodiments, the system presents a signup screen, or presents the option of either signing up or logging in. If account login or signup is successful, then the system performs account login or signup procedures accordingly.

At block 210, the system creates an information exchange session for the partner. In some embodiments, the information exchange session is involved in establishing the security and authenticated credentials for a login session within the enterprise environment.

At block 212, the system provides, on a display of the partner device, a user interface presenting the information that the client wishes to share with the partner. In some embodiments, this user interface includes the subset of the client data that the client has selected for sharing. In some embodiments, this user interface includes the one or more screen sets that the client has chosen, representing screens of the client's user interface within the enterprise environment that the client wishes to share with the partner. In some aspects, the system restricts all access, and doesn't allow communication or display of, aspects of the client's information, environment, user interface, personal data, project data or metadata, or other client aspects that the client does not choose or select to share with the partner. In some embodiments, one or more pieces of the client data, or all of the client data presented in the user interface provided to the user are editable. In some embodiments, editable pieces of data, documents, and more are marked with a special symbol, logo, or other designation for editability.

In some embodiments, the system receives a partner update from the partner device associated with the partner, consisting of one or more proposed edits to the shared pieces of client data. In some embodiments, the user interface for the partner allows for editing of documents, data, and client information directly within the user interface. Upon editing and submitting any proposed edits, the partner device sends them to the system. The system then sends the partner update to the client, and then receives a validation of at least a portion of the partner update from the client. In some embodiments, the client can select any number of the proposed edits for acceptance or rejection, and the accepted portions are submitted as validations of the proposed edits to the system. The system then incorporates the validation of the portion or all of the partner update into the pieces of client data.

FIGS. 3 through 11 show examples of a typical workflow for information exchange in an enterprise environment. Within these examples, a client of an example project management enterprise environment, named "Planisware", exchanges project information with a partner. The client has the goals of sharing only the parts of the project the client wishes to share, and only the screens the client wants the partner to work on. Within this system, a Planisware software-as-a-service (SaaS) environment is presented for all partners of the customer, while the client is provided access to his own user interface (or "portal") as part of the Planisware customer system. There is datamodel synchronization between the SaaS environment and the client portal. In some embodiments, the two aspects of the environment communicate and exchange data and instructions via a Javascript Object Notation (JSON) archive exchange over https on customer request. In some embodiments, other programmatic methods of bridging the two environments can be used instead of JSON and/or https. In some embodiments, the SaaS environment itself does not store any client data. In some embodiments, the SaaS environment only stores client data temporarily as it is being transmitted to a partner device and then deleted when the data has been successfully transmitted.

Figure 3:
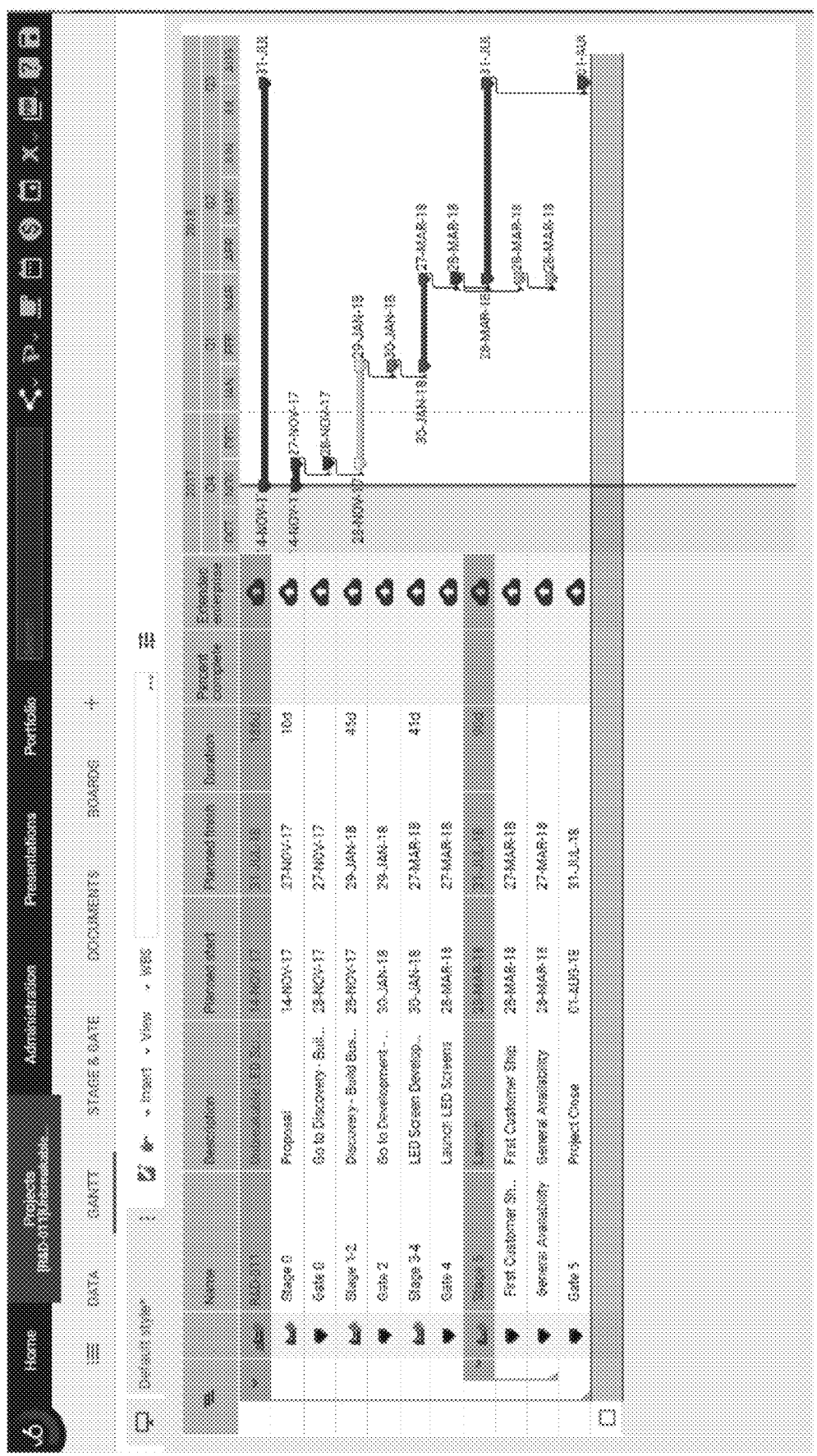
FIG. 3 shows an example of selecting information for exchange in the enterprise environment.

FIG. 3 shows an example of selecting information for exchange in the enterprise environment. The example illustrates a typical user interface for a customer of the enterprise environment, and presents the customer's information related to project management information and tasks. On the left side of the user interface is a list of project stages and milestones, with a planned start, planned finish, duration, percent complete, and a user interface button with a designation for uploading to the cloud, marked "Extended enterprise". On the right is a visual representation of the project timeline. In order to select and determine the information exchange perimeter, the client is allowed to choose any of the stages or milestones of the project on the left, and click on the "Extended enterprise" button to signal to the system that the client wishes to share this information with a partner.

Figure 4:
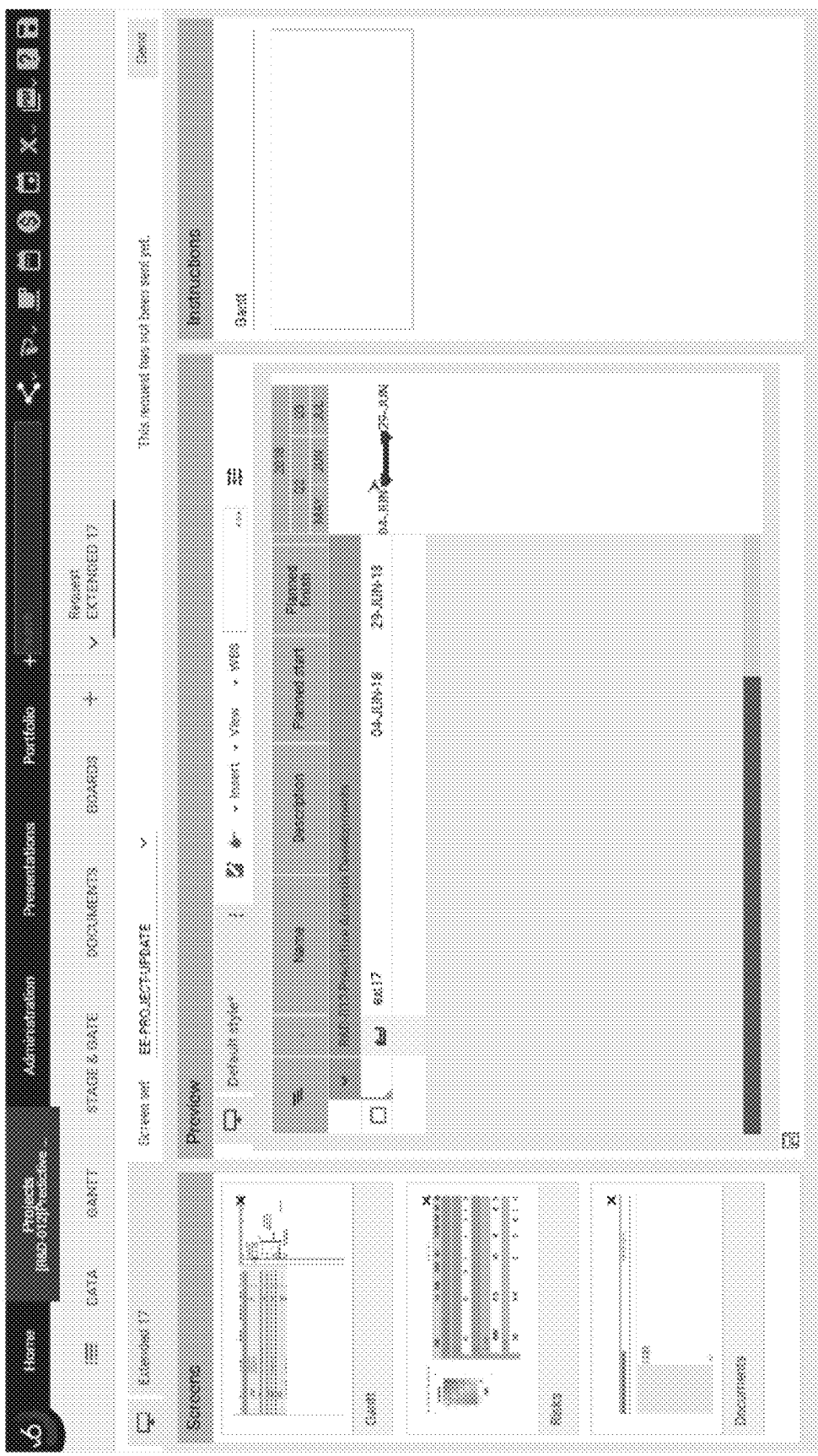
FIG. 4 shows an example of selecting a screen set for exchange in the enterprise environment.

FIG. 4 shows an example of selecting a screen set for exchange in the enterprise environment. In some embodiments, in addition to selecting aspects of the client's project to share, the client may also have the option of sharing one or more screens of the client's user interface. In some embodiments, this selection is not equivalent to a screen capture or direct screen exchange. Instead, the project data and metadata, as well as visual aspects of the screen are converted into formatted code, such as JSON format code, and then converted back into a format provided to the partner through the partner's user interface once the partner has an information exchange session operable. In this example, the client chooses to share a screen related to R&D Predictive Analysis Developments.

Figure 5:
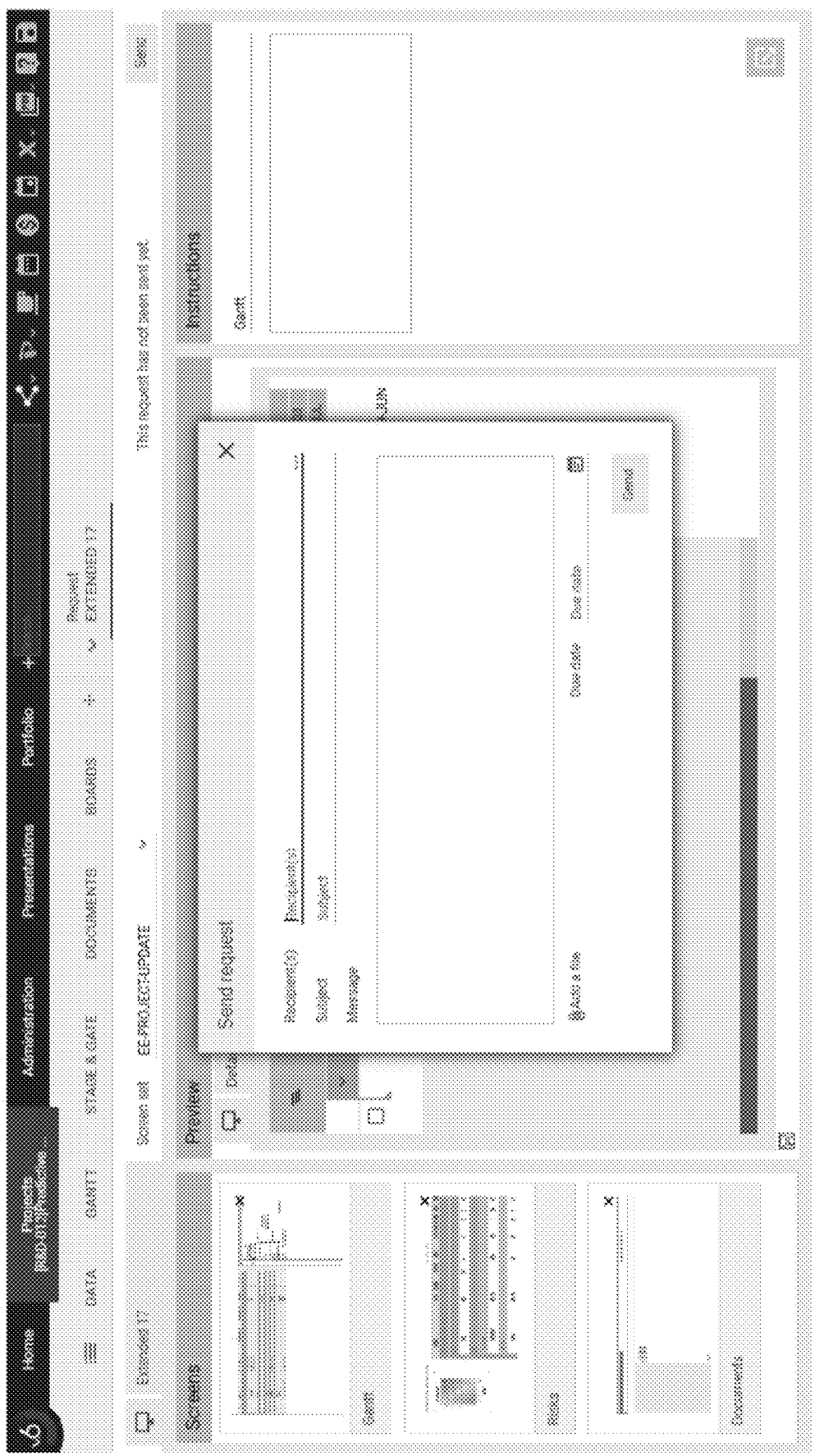
FIG. 5 shows an example of sending a client request in the enterprise environment.

FIG. 5 shows an example of sending a client request in the enterprise environment. In some embodiments, upon determining the information exchange perimeter, including, for example, selecting project documents and/or screen sets, the client is presented with the option of sending a request to a recipient, in this case the partner. In this example, the client can choose one or more recipients, choose a subject, and write a message, as well as add a file and a due date. These details will be presented to the partner as a client request, along with one or more details about what the client wishes to share with the partner.

Figure 6:
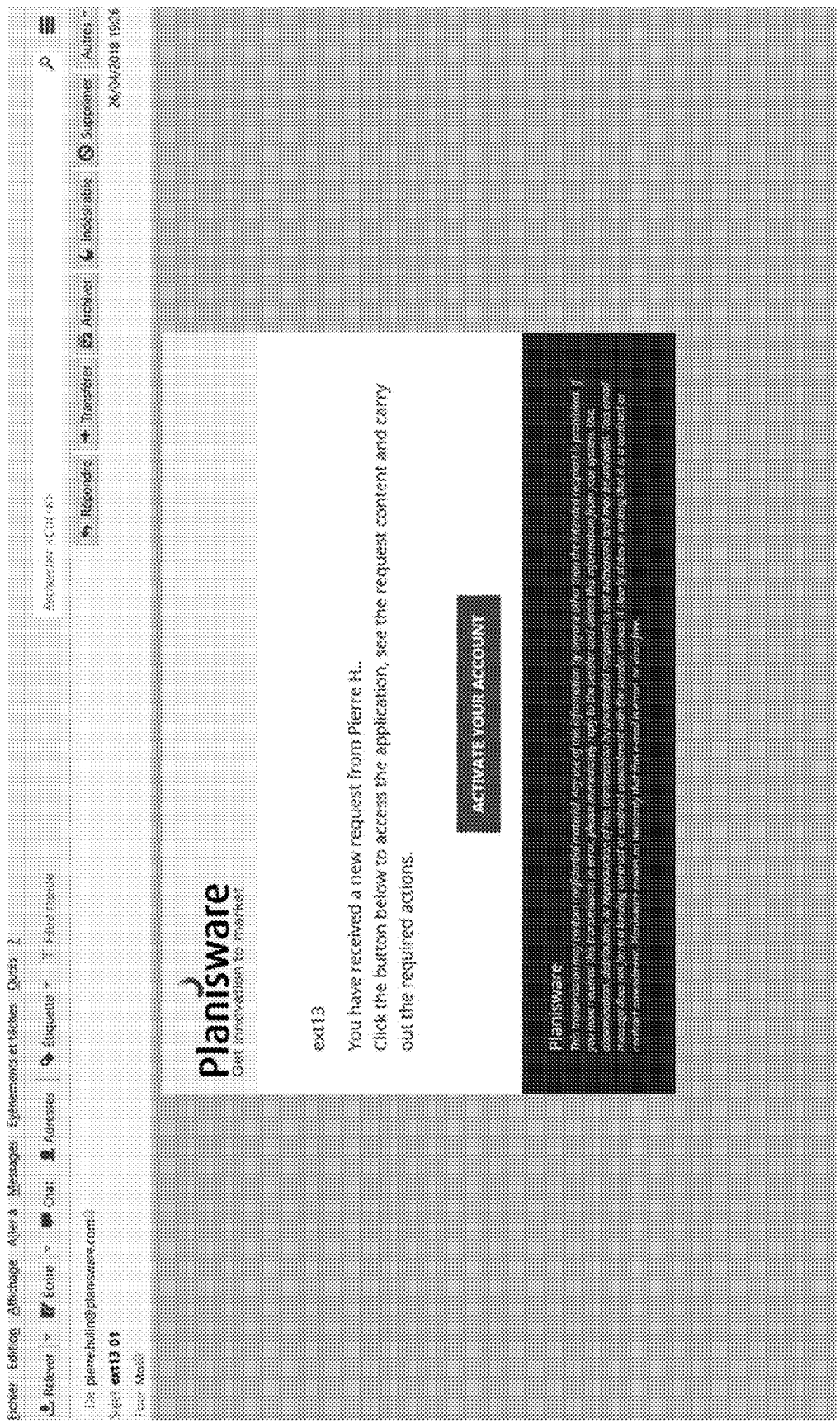
FIG. 6 shows an example of a client request being received by the partner.

FIG. 6 shows an example of a client request being received by the partner. In the partner's email, a message is received informing the partner that he has received a new request from the client. The partner is presented with the option to access the application. In this example, since the partner did not previously have an activated account within the system, a button is presented with the option to activate an account.

Figure 7:
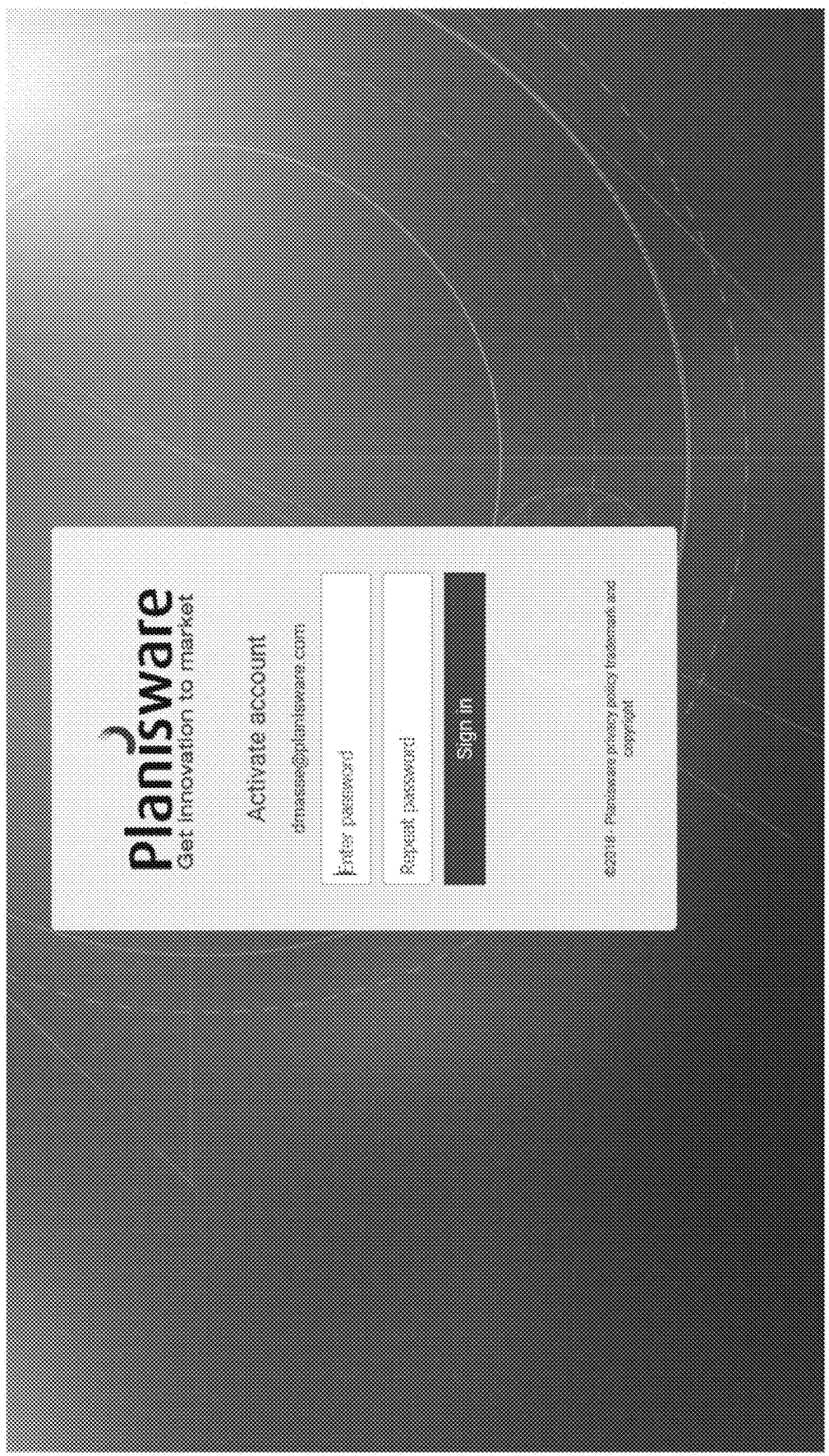
FIG. 7 shows an example of presenting a partner account activation screen in the enterprise environment.

FIG. 7 shows an example of presenting a partner account activation screen in the enterprise environment. In some embodiments, this screen may take the form of a login screen or a signup screen, or both options may be presented to the partner in some fashion.

Figure 8:
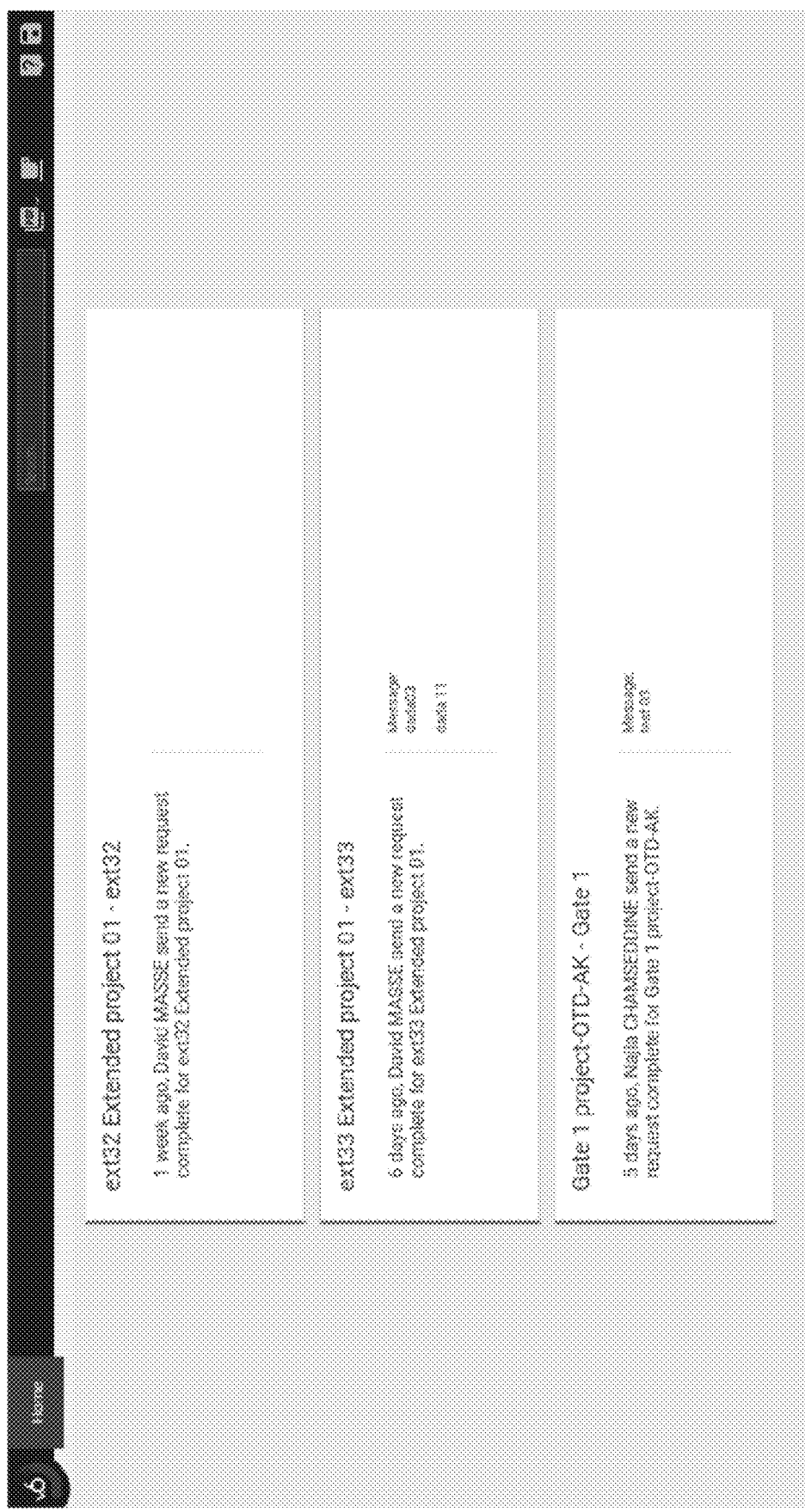
FIG. 8 shows an example of a partner's homepage in the enterprise environment.

FIG. 8 shows an example of a partner's homepage in the enterprise environment. Upon activating an account or logging in, the partner is presented with updates related to new client requests that the partner has been given. The top update shows the client request of FIG. 4.

Figure 9:
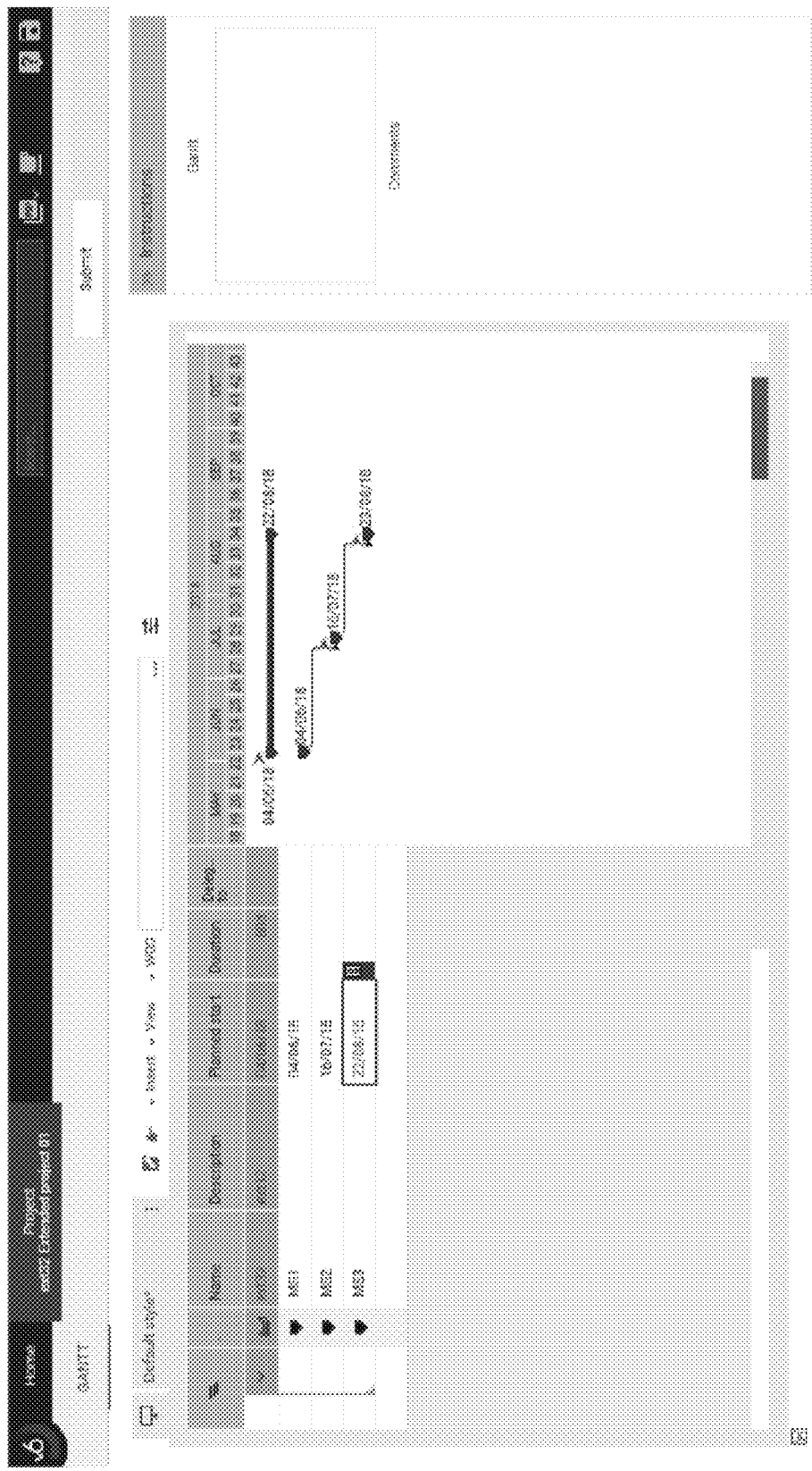
FIG. 9 shows an example of a partner's user interface in the enterprise environment.

FIG. 9 shows an example of a partner's user interface in the enterprise environment. In this example, the partner has been provided with an authenticated session for information exchange within the Planisware SaaS environment, which in some embodiments provides restricted or limited access to the client's information based on what the client request stipulates. While the system creates this partner environment, the client on the client's local user interface selects the client's information and pushes it to the cloud after retrieving it from a client information database. In this way, the client's information remains secure and is not presented to either the system as a whole, the system's maintainers, or the partner. In this example, the partner is choosing to edit a piece of client information presented to him, changing the planned start date of MS3 to 22/08/18. In some embodiments, the partner's user interface mirrors the client's user interface. In some embodiments, the partner's user interface is personalized and is different from the client's user interface. In some embodiments, the partner's user interface is different in some aspects from the client's user interface but the same in other aspects, e.g., the shared screen sets.

Figure 10:
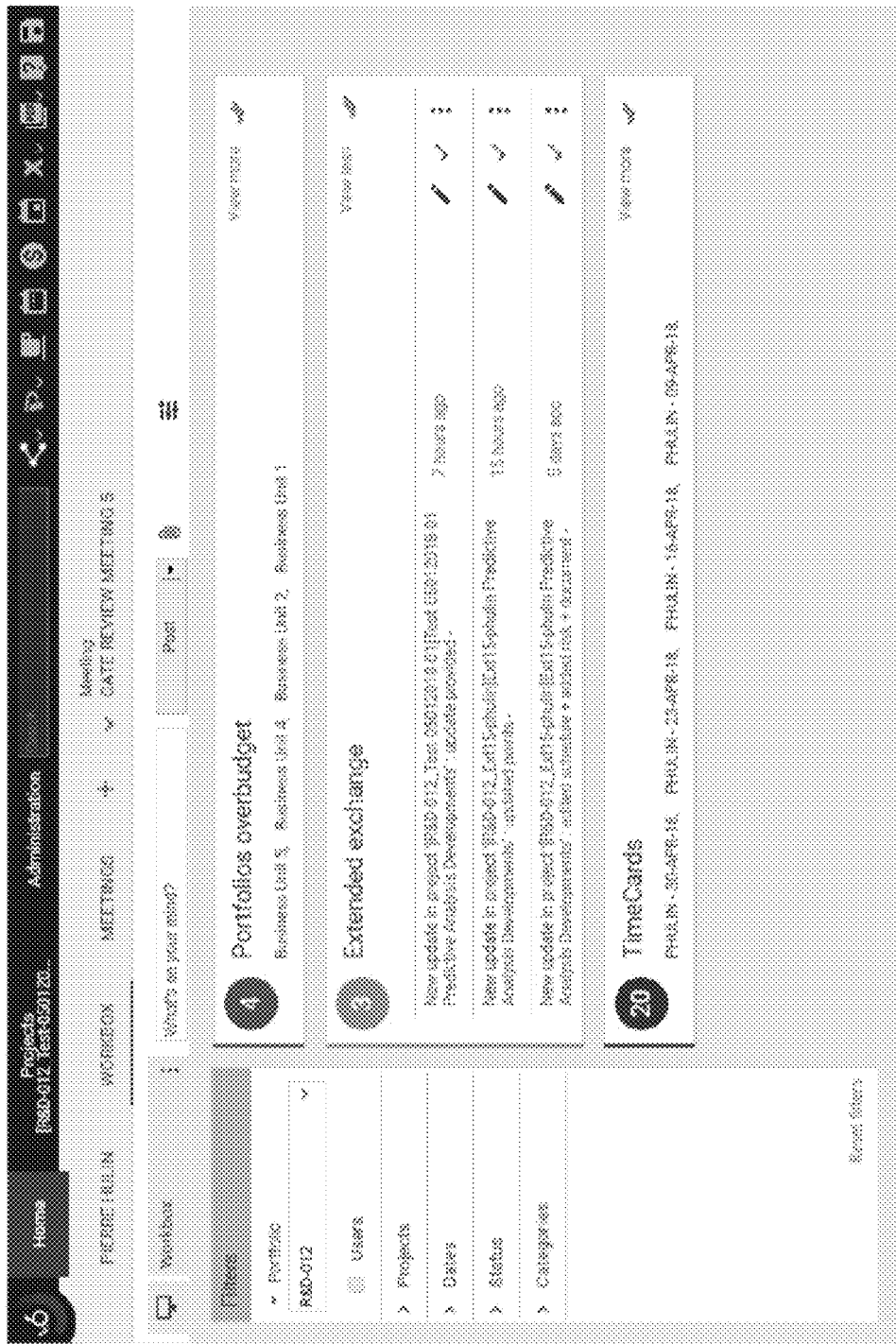
FIG. 10 shows an example of a client receiving a partner update in the enterprise environment.

FIG. 10 shows an example of a client receiving a partner update in the enterprise environment. In this example, the client logged into the client's user interface receives a new update notifying the client that a partner update has been provided in the project Predictive Analysis Developments. In some embodiments, the client is presented with options to edit, approve, or reject the proposed update from the partner.

Figure 11:
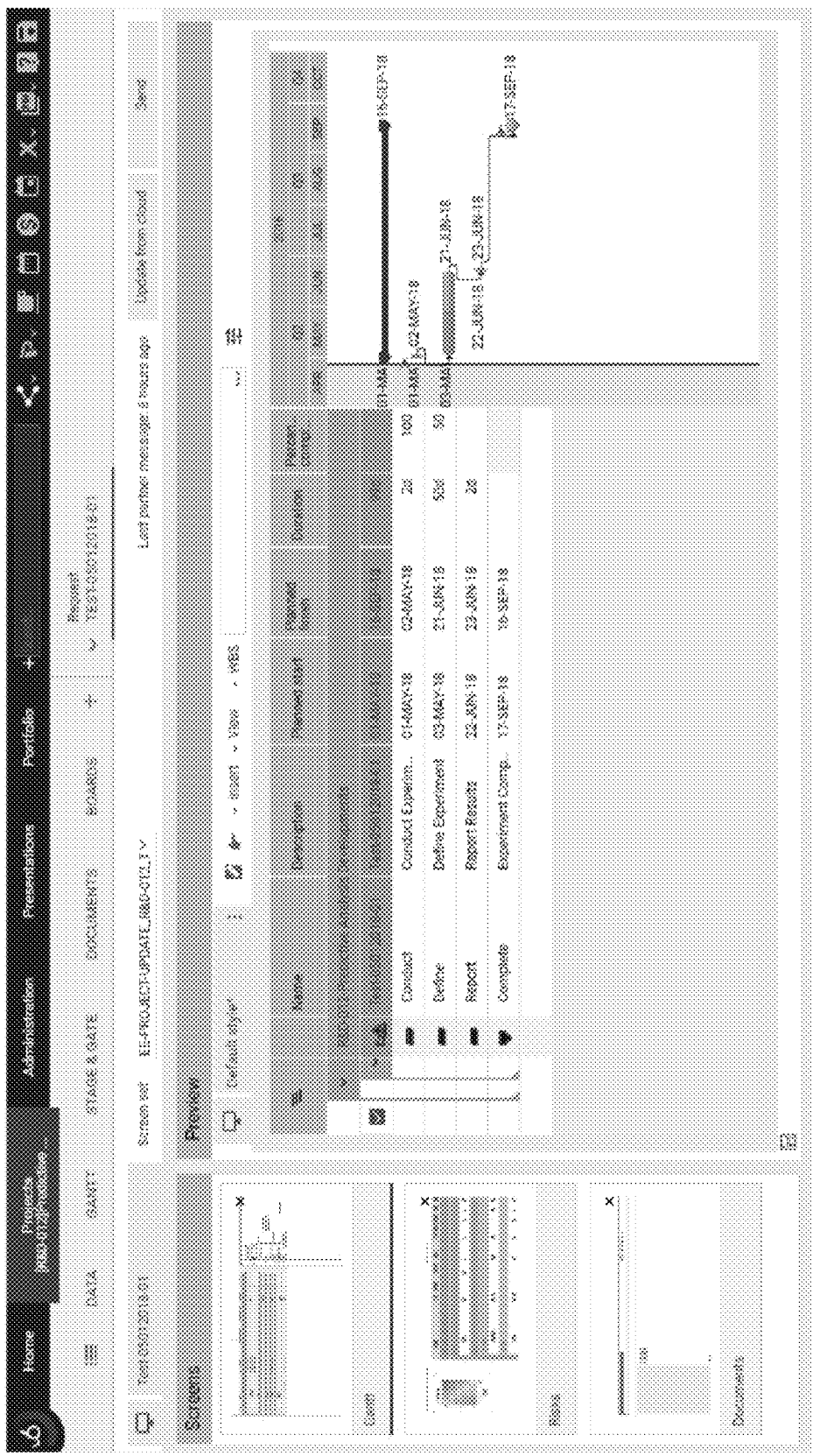
FIG. 11 shows an example of a client validating partner updates in the enterprise environment.

FIG. 11 shows an example of a client validating partner updates in the enterprise environment. In this example, the client is provided the ability to review the partner updates to the project information, including changed dates. The client may choose to revise or edit further, and/or validate the partner updates so that they take effect. In some embodiments the client may do so in a granular fashion for each individual edit or tracked change to the project information. Once the client validates the partner updates, the system incorporates them into the project information.

Figure 12:
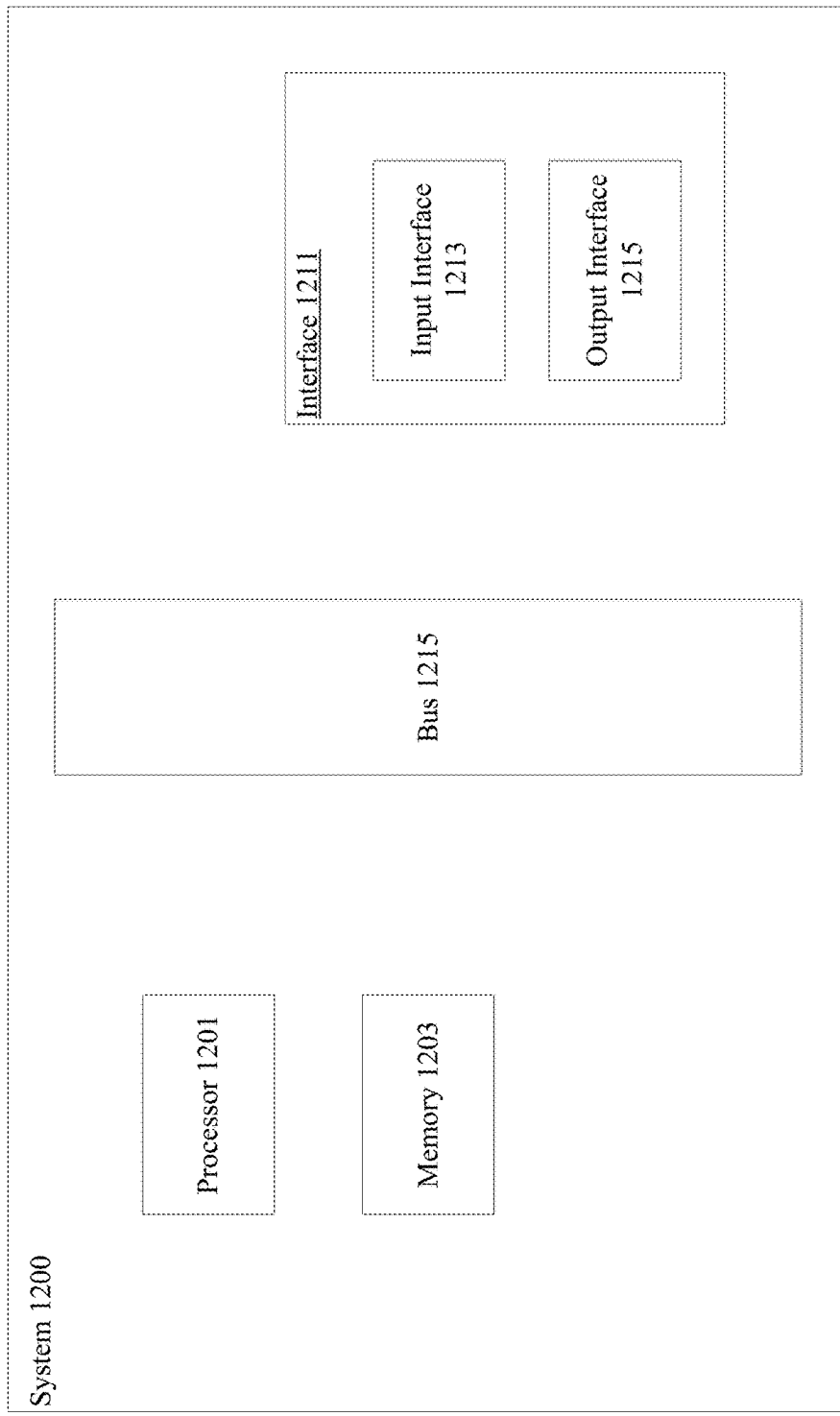
FIG. 12 illustrates one example of a computer system.

Various computing devices can implement the methods described. For instance, a mobile device, computer system, etc. can be used for accessing aspects of the enterprise environment by either the client or the partner, or both. With reference to FIG. 12, shown is a particular example of a computer system that can be used to implement particular examples of the present invention. For instance, the computer system 1200 can be used to provide generate artificially rendered images according to various embodiments described above. In addition, the computer system 1200 shown can represent a computing system on a mobile device. According to particular example embodiments, a system 1200 suitable for implementing particular embodiments of the present invention includes a processor 1201, a memory 1203, an interface 1211, and a bus 1215 (e.g., a PCI bus). The interface 1211 may include separate input interface 1213 and output interface 1215, or may be a unified interface supporting both operations. When acting under the control of appropriate software or firmware, the processor 1201 is responsible for such tasks such as optimization. Various specially configured devices can also be used in place of a processor 1201 or in addition to processor 1201. The complete implementation can also be done in custom hardware. The interface 1211 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1200 uses memory 1203 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   maintaining an enterprise environment comprising a plurality of clients, wherein each client is associated with a set of client data;
   sending a client request, from a client at a client device, to a partner device of a partner associated with the client, the client request comprising a subset of the client data and one or more screen sets to be shared, the subset of the client data and the one or more screen sets being selected by the client in a client user interface, wherein the enterprise environment is configured to allow the client to have granular control over which data is sent in the client request, the data including project, activity and task metadata, portions of screens, and screens with elements redacted or blurred;
   receiving a notification that the partner has responded to the client request with an acceptance;
   sending one of an account creation request or account login request to the partner device;
   creating an information exchange session for the partner, wherein the information exchange session occurs between a software-as-a-service (SAAS) environment for the partner device and a client portal for the client device, and wherein updates to the information exchange session occur via datamodel synchronization between the SAAS environment and the client portal, wherein the SAAS environment itself does not store any client data; and
   providing, on a display of the partner device, a partner user interface comprising the subset of the client data and the one or more screen sets, wherein access to the enterprise environment by the partner is not a direct screen exchange, but instead, restricted to only the subset of the client data and the one or more screen sets, wherein the one or more screen sets are shared by first being converted into JSON format and then being converted into a format for display on the partner device, and wherein one or more pieces of client data are editable by the partner via the partner user interface;
   wherein the client request, the notification and the updates to the information exchange session are transmitted via asynchronous communication.

2. The method of claim 1, further comprising:
   receiving a partner update associated with the partner comprising one or more proposed edits to the subset of the client data;
   sending the partner update to the client device;
   receiving a validation of at least a portion of the partner update; and
   incorporating the validation of the at least a portion of the partner update into the subset of the client data.

3. The method of claim 1, wherein each of the one or more screen sets comprises one or more pieces of client data presented in a partner user interface screen, the partner user interface screen mirroring at least a portion of one or more user interface screens associated with the client user interface.

4. The method of claim 1, wherein the enterprise environment is implemented as a Software as a Service (SaaS) environment.

5. The method of claim 1, wherein the asynchronous communication includes email, text message, or social media message.

6. The method of claim 1, wherein the client maintains its own database system and does not share access to the database system with the partner.

7. The method of claim 1, wherein at least a portion of the partner user interface is different than the client user interface.

8. A system comprising:
   a processor; and
   memory, the memory storing program instructions to execute a method, the method comprising:
   maintaining an enterprise environment comprising a plurality of clients, wherein each client is associated with a set of client data;
   sending a client request, from a client at a client device, to a partner device of a partner associated with the client, the client request comprising a subset of the client data and one or more screen sets to be shared, the subset of the client data and the one or more screen sets being selected by the client in a client user interface, wherein the enterprise environment is configured to allow the client to have granular control over which data is send in the client request, the data including project, activity, and task metadata, portions of screens, and screens with elements redacted or blurred;

receiving a notification that the partner has responded to the client request with an acceptance;

sending one of an account creation request or account login request to the partner device;

creating an information exchange session for the partner, wherein the information exchange session occurs between a software-as-a-service (SAAS) environment for the partner device and a client portal for the client device, and wherein updates to the information exchange session occur via datamodel synchronization between the SAAS environment and the client portal, wherein the SAAS environment does not store any client data; and providing, on a display of the partner device, a partner user interface comprising the subset of the client data and the one or more screen sets, wherein access to the enterprise environment by the partner is not a direct screen exchange, but instead, restricted to only the subset of the client data and the one or more screen sets, wherein the one or more screen sets are shared by first being converted into JSON format and then being converted into a format for display on the partner device, and wherein one or more pieces of client data are editable by the partner via the partner user interface;

wherein the client request, the notification and the updates to the information exchange session are transmitted via asynchronous communication.

9. The system of claim 8, wherein the method further comprises:

receiving a partner update associated with the partner comprising one or more proposed edits to the subset of the client data;

sending the partner update to the client device;

receiving a validation of at least a portion of the partner update; and incorporating the validation of the at least a portion of the partner update into the subset of the client data.

10. The system of claim 8, wherein each of the one or more screen sets comprises one or more pieces of client data presented in a partner user interface screen, the partner user interface screen mirroring at least a portion of one or more user interface screens associated with the client user interface.

11. The system of claim 8, wherein the enterprise environment is implemented as a Software as a Service (SaaS) environment.

12. The system of claim 8, wherein the asynchronous communication includes email, text message, or social media message.

13. The system of claim 8, wherein the client maintains its own database system and does not share access to the database system with the partner.

14. The system of claim 8, wherein at least a portion of the partner user interface is different than the client user interface.

15. A non-transitory computer readable medium storing instructions to execute a method, the method comprising:

maintaining an enterprise environment comprising a plurality of clients, wherein each client is associated with a set of client data;

sending a client request, from a client at a client device, to a partner device of a partner associated with the client, the client request comprising a subset of the client data and one or more screen sets to be shared, the subset of the client data and the one or more screen sets being selected by the client in a client user interface, wherein the enterprise environment is configured to allow the client to have granular control over which data is sent in the client request, the data including project, activity, and task metadata, portions of screens, and screens with elements redacted or blurred;

receiving a notification that the partner has responded to the client request with an acceptance;

sending one of an account creation request or account login request to the partner device;

creating an information exchange session for the partner, wherein the information exchange session occurs between a software-as-a-service (SAAS) environment for the partner device and a client portal for the client device, and wherein updates to the information exchange session occur via datamodel synchronization between the SAAS environment and the client portal, wherein the SAAS environment itself does not store any client data; and providing, on a display of the partner device, a partner user interface comprising the subset of the client data and the one or more screen sets, wherein access to the enterprise environment by the partner is not a direct screen exchange, but instead, restricted to only the subset of the client data and the one or more screen sets, wherein the one or more screen sets are shared by first being converted into JSON format and then being converted into a format for display on the partner device, and wherein one or more pieces of client data are editable by the partner via the partner user interface;

wherein the client request, the notification and the updates to the information exchange session are transmitted via asynchronous communication.

16. The non-transitory computer readable medium of claim 15, wherein the method further comprises:

receiving a partner update associated with the partner comprising one or more proposed edits to the subset of the client data;

sending the partner update to the client device;

receiving a validation of at least a portion of the partner update; and incorporating the validation of the at least a portion of the partner update into the subset of the client data.

17. The non-transitory computer readable medium of claim 15, wherein each of the one or more screen sets comprises one or more pieces of client data presented in a partner user interface screen, the partner user interface screen mirroring at least a portion of one or more user interface screens associated with the client user interface.

18. The non-transitory computer readable medium of claim 15, wherein the enterprise environment is implemented as a Software as a Service (SaaS) environment.

19. The non-transitory computer readable medium of claim 15, wherein the asynchronous communication includes email, text message, or social media message.

20. The non-transitory computer readable medium of claim 15, wherein the client maintains its own database system and does not share access to the database system with the partner.

* * * * *